United States Patent

[11] 3,614,481

| | | |
|---|---|---|
| [72] | Inventor | Robert B. Halliday<br>R.D. #1, Chenango Forks, N.Y. 13746 |
| [21] | Appl. No. | 833,289 |
| [22] | Filed | June 16, 1969 |
| [45] | Patented | Oct. 19, 1971 |

[54] ELECTROSTATIC GENERATOR
10 Claims, 6 Drawing Figs.

| | | |
|---|---|---|
| [52] | U.S. Cl. | 310/6 |
| [51] | Int. Cl. | H02n 1/00 |
| [50] | Field of Search | 310/5, 6, 7 |

[56] References Cited
UNITED STATES PATENTS

| 410,053 | 8/1889 | Voss | 310/7 |
|---|---|---|---|
| 1,011,939 | 12/1911 | Ghilarducci | 310/6 |

Primary Examiner—D. X. Sliney
Attorney—Charles S. McGuire

ABSTRACT: A device for collecting a charge of static electricity by rotating a disc or wheel carrying a plurality of individual conductors in proximity to a pair of stationary conductors. Four stationary brushes are arranged in two pairs to wipe the charge from the individual conductors which is initially induced by the natural imbalance in static charge between the stationary and moving conductors. The charges from each pair of brushes are returned to the stationary conductors and stored on an appropriate capacitor.

PATENTED OCT 19 1971 3,614,481

Robert B. Halliday
INVENTOR.

BY Charles L. McGuire
Attorney

PATENTED OCT 19 1971

Robert B. Halliday
INVENTOR
BY Charles S. McGuire
Attorney

ELECTROSTATIC GENERATOR

This invention relates to electrostatic generators or static electric machines.

Although static electricity has relatively few practical uses, as compared to current electricity, a large number of mechanical arrangements have been devised for concentrating electrical charges produced by attraction and repulsion between particles carrying like or unlike electrical charges. Certain types of electrostatic generators have been successfully used to boost protons and other nuclear particles to energy levels of 10 million electron volts, producing narrow beams of known energy which may be used to study nuclear forces. Other such devices are intended to accumulate much lower charges and may be used merely as instructional aids in demonstrating the physical phenomena which they represent.

The present invention comprises an electrostatic generator of the rotary type wherein electrons are moved through brushes from moving conductors to stationary conductors to cause an initial, low imbalance in electrical charge to become greater and greater. The brushes are preferably provided at intervals of 90° around the path of the rotating conductors, the brushes of one opposing pair being electrically connected to one another and the other pair being insulated from one another and individually connected to the two stationary conductors. The latter may conveniently be carried on a rigid backing which also supports the rotatable disc with the movable conductors in a closely spaced, parallel plane. The backing plate and disc may be carried by a base support which also holds the plates of a capacitor which stores the charge conducted from the stationary conductors. The brushes may be positioned between the backing plate and rotatable disc, or may be (preferably in smaller dimensioned units) carried by arms attached to the backing plate and extending on the opposite side therefrom of the disc.

It is a principal object of the invention to provide an electrostatic generator adapted to accumulate an electrical charge of relatively high voltage in relation to its size.

A further object is to provide a simple and economical device of instructional value in demonstrating the phenomenon of static electricity and accumulation of high-voltage charges therefrom.

Still another object is to provide a device extremely inexpensive to fabricate and assemble which will cyclically charge a capacitor and allow discharge or arcing thereof each time the charge reaches a predetermined voltage level.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
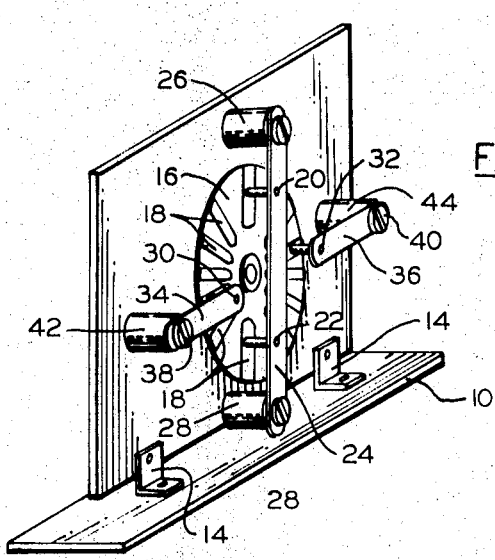
FIG. 1 is a front perspective view of one embodiment of apparatus embodying the invention.
Figure 2:
FIG. 2 is a rear elevational view of the apparatus of FIG. 1.
Figure 2:
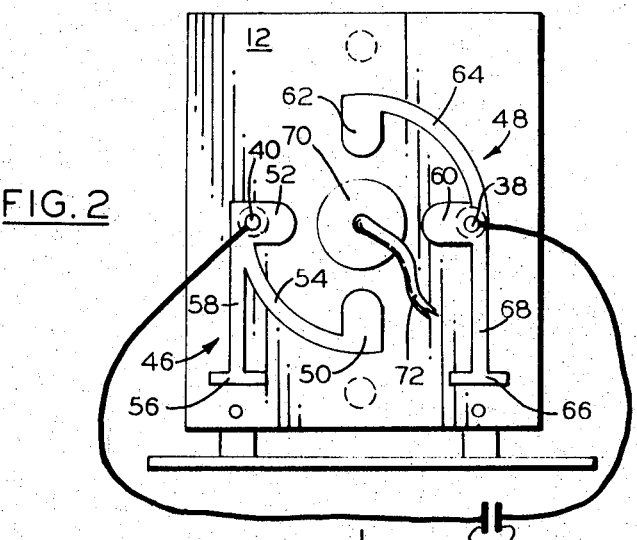
Figure 3:
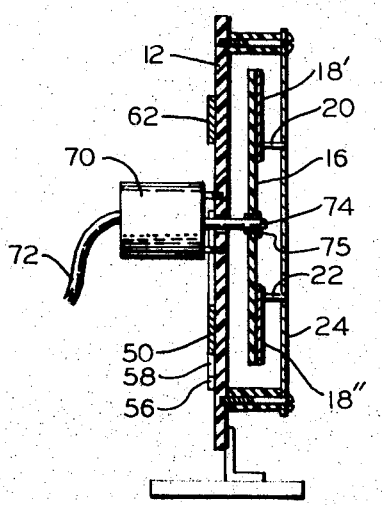
FIG. 3 is a side view in section on the line 3—3 of FIG. 2.

The invention is shown in a first embodiment in FIGS. 1-3 comprising base 10, adapted to rest on a flat surface and support the other elements, backing plate 12, attached to base 10 by brackets 14, and disc 16 rotatably supported with respect to the backing plate. Disc 16 is made of material which is a good electrical insulator and carries a plurality of individual electric conductors 18, each insulated from the others. A first pair of brushes 20 and 22 is carried by arm 24, which is made of electrically conducting material at least in the portion between brushes 20 and 22 so that the latter are in electrical contact with one another.

Arm 24 is attached to backing plate 12 by screws, rivets or other appropriate fasteners and insulated therefrom by spacers 26 and 28 which hold the arm in slightly spaced relation to the front surface of disc 16. A second pair of brushes 30 and 32 is held by conducting arms 34 and 36, respectively, which are attached to backing plate 12 by conducting screws 38 and 40 and held in properly spaced relation by spacers 42 and 44. Arms 34 and 36 may be joined, of course, to form a single arm, crossing arm 24, if the portion between brushes 30 and 32 is made of an insulator so that the brushes are not in electrical contact with one another.

Turning now to FIG. 2, backing plate 12 carries on its rear surface a pair of stationary conductors designated generally by the reference numerals 46 and 48. Conductor 46 includes a pair of lobes 50 and 52, spaced at 90° on the path of a circle rearwardly adjacent conductors 18 on disc 16, and joined by conducting path 54. Lower conducting portion 56 is joined by path 58 to lobe 52. Conductor 48 includes lobes 60 and 62, also spaced 90° from one another and from lobes 50 and 52, electrically connected by conducting path 64 and connected to lower portion 66 by conducting path 68. Lower portions 56 and 66 of the stationary conductors are connected to opposite plates of an appropriate capacitor, shown schematically in FIG. 2 and indicated by the reference numerals 76 and 78.

Also carried on the rear surface of backing plate 12 is electric motor 70 having cord 72 for connection to an appropriate power source for driving the motor. Shaft 74 (FIG. 3) of motor 70 extends through an opening somewhat larger than the shaft in backing plate 12 and disc 16 is mounted on the end of the shaft with rubber grommet 75 providing a tight frictional engagement.

The space between adjacent surfaces of backing plate 12 and disc 16 should be minimal since the initial flow of electrons from conductors 18 through the brushes upon movement of disc 16 is induced by the natural imbalance in charge between the stationary conductors on the backing plate and the adjacent movable conductors on the disc. For example, lobe 62 of stationary conductor 48 will naturally have an initial concentration of electrons either higher or lower than that of the adjacent conductor 18, shown in the uppermost position in FIG. 3 and designated with the notation 18'. Assuming lobe 62 is more negative it will tend to repel any negative charge in conductor 18', driving electrons through conducting brush 20. The loss of electrons results in conductor 18' becoming positively charged as electrons flow through brush 20, conducting support arm 24 and brush 22 to collect on the movable conductor shown in the lowermost position in FIG. 3 and designated with the notation 18''. Thus, conductors 18' and 18'' carry positive and negative charges, respectively, as they move in a clockwise direction out of contact with brushes 20 and 22. When these two conductors reach brushes 32 and 30, respectively, the charges are wiped off, the positive charge from conductor 18' flowing through brush 32, conducting arm 36, conducting screw 40 and is transferred to stationary conductor 46. The negative charge from conductor 18'' flows through brush 30, conducting arm 34, conducting screw 38 and is transferred to stationary conductor 48. These two movable conductors (18' and 18'') are then neutral until returning to their respective original positions at the top and bottom of disc 16 as shown in FIG. 3 and the process is repeated. The same cycle applies, of course, with all the movable conductors as the disc continues to rotate and the positive and negative charges transferred to stationary conductors 46 and 48, and thus to capacitor plates 76 and 78, respectively, continue to increase.

Figures 4, 5, 6:
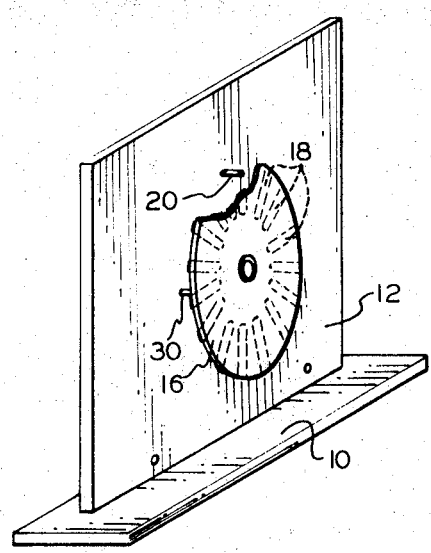
FIG. 4 is a front perspective view of a second embodiment of the invention.
FIG. 5 is a rear view of the FIG. 4 embodiment.
FIG. 6 is a side view in section on the line 6—6 of FIG. 5.

Turning now to the embodiment of FIGS. 4–6, wherein like reference numerals are used to denote elements which may be the same as those shown in the first embodiment, base 10 again supports backing plate 12, attached thereto by brackets 14. Disc 16 carries a plurality of radially spaced and individually insulated conductors 18, this time facing backing plate 12. Disc 16 is centrally supported on shaft 74 of motor 70, with rubber grommet 75 providing a tight frictional engagement. Again stationary conductor 46, having lobes 50 and 52 and conducting paths 54 and 58, and conductor 48, having lobes 60 and 62 and conducting paths 64 and 68, are provided on the side of backing plate 12 opposite disc 16.

In the present embodiment, however, the arms supporting the brushes are omitted since the latter are mounted directly on the backing plate. Brushes 30 and 32 are connected to stationary conductors 46 and 48; brushes 20 and 22 are again in electrical contact with one another, but in the present embodiment this is accomplished by an additional conducting path 80 on backing plate 12, as seen in FIG. 5. Thus, the basic operation of the apparatus to cause steadily increasing positive and negative charges on stationary conductors 46 and 48 as disc 16 is rotated is the same as in the first embodiment. The structure is somewhat simplified, however, by elimination of the brush support arms. The linear distance between the closest points on conducting path 80 and stationary conductors 46 and 48 must, of course, be great enough that arcing does not occur as the electrostatic charge builds up.

Also shown in the FIGS. 4-6 embodiment is a means for incorporating the capacitor plates directly in base 10. Brackets 14 are made of a conducting material and attached directly to stationary conductors 46 and 48. The bracket attached to stationary conductor 48 rests on plate 78, which is exposed on a portion of the upper surface of base 10, being secured thereto by screw 82. The bracket attached to stationary conductor 46 is secured to base 10 by conducting screw 84, which passes through insulating layer 86, plate 76 and into insulating layer 88. Thus, conductor 46 is placed in electrical contact with capacitor plate 76 by the bracket and screw 84. In this embodiment base 10 may most conveniently be made of two pieces, namely, insulating sheets 86 and 88 having conducting plates 78 and 76, respectively, integral therewith. Also, it may be desirable to have a portion of the upper surface of plate 76 exposed, by cutting away some of insulating layer 86, to facilitate shorting the capacitor plates as desired. The plates may be spaced in either embodiment, of course, so that arcing between the plates occurs each time the charge reaches a predetermined level.

Backing plate 12, carrying stationary conductors 46 and 48, and disc 16, carrying movable conductors 18, may be conveniently fabricated in the manner of circuit boards, i.e., by providing sheets of insulating material covered with a thin conducting layer of copper, or the like, and removing portions of the latter by etching to leave the desired conducting areas on the sheet. Brushes 20, 22, 30 and 32 may be economically and conveniently formed as loops of conducting tape, such as rubber tape containing carbon.

I claim:

1. An electrostatic generator comprising, in combination:
  a. a first pair of conducting brushes electrically connected to one another;
  b. A second pair of conducting brushes electrically insulated from one another and from the brushes of said first pair;
  c. first and second electrical conductors mounted on a common first support and electrically insulated from one another,
  d. means electrically connecting one of the brushes of said second pair to said first conductor, and the other to said second conductor;
  e. a plurality of individually insulated additional conductors mounted on a common second support;
  f. means for causing movement of said additional conductors relative to said brushes, in successive winding contact with brushes of opposite ones of said pairs, and to said first and second conductors, in physical proximity thereto close enough to allow significant mutual influence of the respective electrical charges of said additional conductors on said first and second conductors, but electrically insulated therefrom; and
  g. means forming an electrical capacitor with the plates connected respectively to said first and second conductors.

2. The invention according to claim 1 wherein said additional conductors are arranged in a circular configuration and said relative movement is rotary.

3. The invention according to claim 2 wherein said additional conductors are arranged on an insulating disc which is rotated while said brushes and said first and second conductors remain stationary.

4. The invention according to claim 3 wherein said brushes and said first and second conductors are carried on an electrically insulating backing plate which also supports motive means for rotating said disc.

5. The invention according to claim 4 wherein said disc and said backing plate are arranged in closely adjacent, parallel planes and said first and second conductors are on the opposite side of said backing plate from said disc.

6. The invention according to claim 5 wherein said first pair of brushes are supported on said backing plate and electrically connected to one another by a further conductor arranged on said backing plate.

7. The invention according to claim 5 wherein said first pair of brushes are supported on and electrically connected to one another by an arm supported on said backing plate in spaced relation to said disc.

8. The invention according to claim 6 wherein said additional conductors are carried on the side of said disc which faces said backing plate and said brushes are spaced 180° from the other brush of the same pair and 90° from the brushes of the opposite pair.

9. The invention according to claim 8 wherein said first conductor includes two enlarged portions, electrically connected and spaced 90° from one another on the path of a circle in a plane adjacent the plane of rotation of said additional conductors, and said second conductor includes two enlarged portions, electrically connected and spaced 90° from one another and from the two portions of said first conductor on the path of said circle.

10. The invention according to claim 9 wherein said backing plate is supported on a base whereon the plates of said capacitor are arranged.